(12) United States Patent
Lahman et al.

(10) Patent No.: US 9,783,727 B2
(45) Date of Patent: Oct. 10, 2017

(54) FLUID LOSS CONTROL PACKAGE FOR USE IN SUBTERRANEAN FORMATION OPERATIONS

(71) Applicant: Halliburton Energy Services, Inc., Houston, TX (US)

(72) Inventors: Matthew Lewis Lahman, Houston, TX (US); Philip D. Nguyen, Houston, TX (US); Janette Cortez, Kingwood, TX (US); Jessica Lynn Heeter, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 20 days.

(21) Appl. No.: 14/920,317

(22) Filed: Oct. 22, 2015

(65) Prior Publication Data

US 2017/0114267 A1    Apr. 27, 2017

(51) Int. Cl.
| | |
|---|---|
| *C09K 8/76* | (2006.01) |
| *C09K 8/516* | (2006.01) |
| *E21B 33/138* | (2006.01) |
| *E21B 21/00* | (2006.01) |
| *C09K 8/514* | (2006.01) |
| *C09K 8/508* | (2006.01) |

(52) U.S. Cl.
CPC ............ *C09K 8/516* (2013.01); *C09K 8/5086* (2013.01); *C09K 8/514* (2013.01); *E21B 21/003* (2013.01); *E21B 33/138* (2013.01)

(58) Field of Classification Search
CPC .......... E21B 21/003; C09K 8/487; C09K 8/76
See application file for complete search history.

(56) References Cited

U.S. PATENT DOCUMENTS

| | | | |
|---|---|---|---|
| 5,680,900 A | 10/1997 | Nguyen et al. | |
| 7,645,725 B2 | 1/2010 | Weaver et al. | |
| 7,674,753 B2 | 3/2010 | Munoz, Jr. et al. | |
| 7,795,186 B2 | 9/2010 | Saini et al. | |
| 7,829,507 B2 | 11/2010 | Todd et al. | |
| 7,866,393 B2 | 1/2011 | Badalamenti et al. | |
| 7,897,545 B2 | 3/2011 | Wilson et al. | |
| 8,563,480 B2 | 10/2013 | Todd et al. | |
| 8,936,086 B2 * | 1/2015 | Liang ................ | C09K 8/035 166/292 |
| 2015/0041132 A1 | 2/2015 | Nelson et al. | |

* cited by examiner

*Primary Examiner* — Catherine Loikith
(74) *Attorney, Agent, or Firm* — McDermott Will & Emery LLP

(57) ABSTRACT

Methods and systems including introducing a treatment fluid into a subterranean formation, wherein the treatment fluid comprises a base fluid and a fluid loss control package (FLCP). The FLCP comprises rigid non-degradable particulates and pliable degradable particulates. The FLCP forms a fluidic seal in the subterranean formation at a target interval, thereby providing fluid loss control therein.

18 Claims, 3 Drawing Sheets

FLUID LOSS CONTROL PACKAGE FOR USE IN SUBTERRANEAN FORMATION OPERATIONS

BACKGROUND

The present disclosure relates to subterranean formation operations and, more particularly, to fluid loss control packages for use in subterranean formation operations.

Hydrocarbon producing wells (e.g., oil producing wells, gas producing wells, and the like) are created and stimulated using various treatment fluids introduced into the wells to perform a number of subterranean formation operations. The general term "treatment fluid," as used herein, refers generally to any fluid that may be used in a subterranean application in conjunction with a desired function and/or for a desired purpose. The term "treatment fluid" does not imply any particular action by the fluid or any component thereof.

Hydrocarbon producing wells are first formed by drilling a wellbore into a subterranean formation, involving circulating a drilling treatment fluid as the wellbore is bored out using a drill bit. Primary cementing may then be performed using a cement slurry treatment fluid to enhance the structural integrity of the wellbore. Stimulation of hydrocarbon producing wells involves introducing a fracturing treatment fluid, sometimes called a carrier treatment fluid when particulates entrained therein. The fracturing treatment fluid is pumped into a portion of a subterranean formation (which may also be referred to herein simply as a "formation") above a fracture gradient sufficient to break down the formation and create one or more fractures therein. As used herein, the term "fracture gradient" refers to a pressure (e.g., flow rate) necessary to create or enhance at least one fracture in a subterranean formation.

Typically, particulate solids are suspended in a portion of one or more treatment fluids and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture."

"Gravel packing" and "frac-packing" are additional stimulation techniques. Gravel packing is a particulate control method in which a permeable screen is placed in a wellbore and the annulus between the screen and the formation surface is packed with gravel of a specific size designed to prevent the passage of loose particles from flowing through the gravel packed screen, referred to as a "gravel pack." "Frac-packing" is a combined hydraulic fracturing and gravel packing treatment in which a substantially particulate-free treatment fluid is pumped through the annulus between a permeable screen and a wellbore above the fracture gradient. Thereafter, a treatment fluid comprising particulates is pumped through the annulus and the particulates are placed within the at least one fracture and in the annulus between the permeable screen and the wellbore, forming both a "proppant pack" in the fracture and a "gravel pack" in the annulus.

During any of the aforementioned subterranean formation operations, a portion of the treatment fluid used may be lost during the operation. This loss may be due, for example, to undesirable leak-off into natural or created fractures or fissures present in the formation. The loss of the treatment fluids may, among other things, render the treatment fluid less effective or ineffective, result in a buildup of any solid materials within the formation (i.e., a "filter cake) hindering production operations, and the like.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
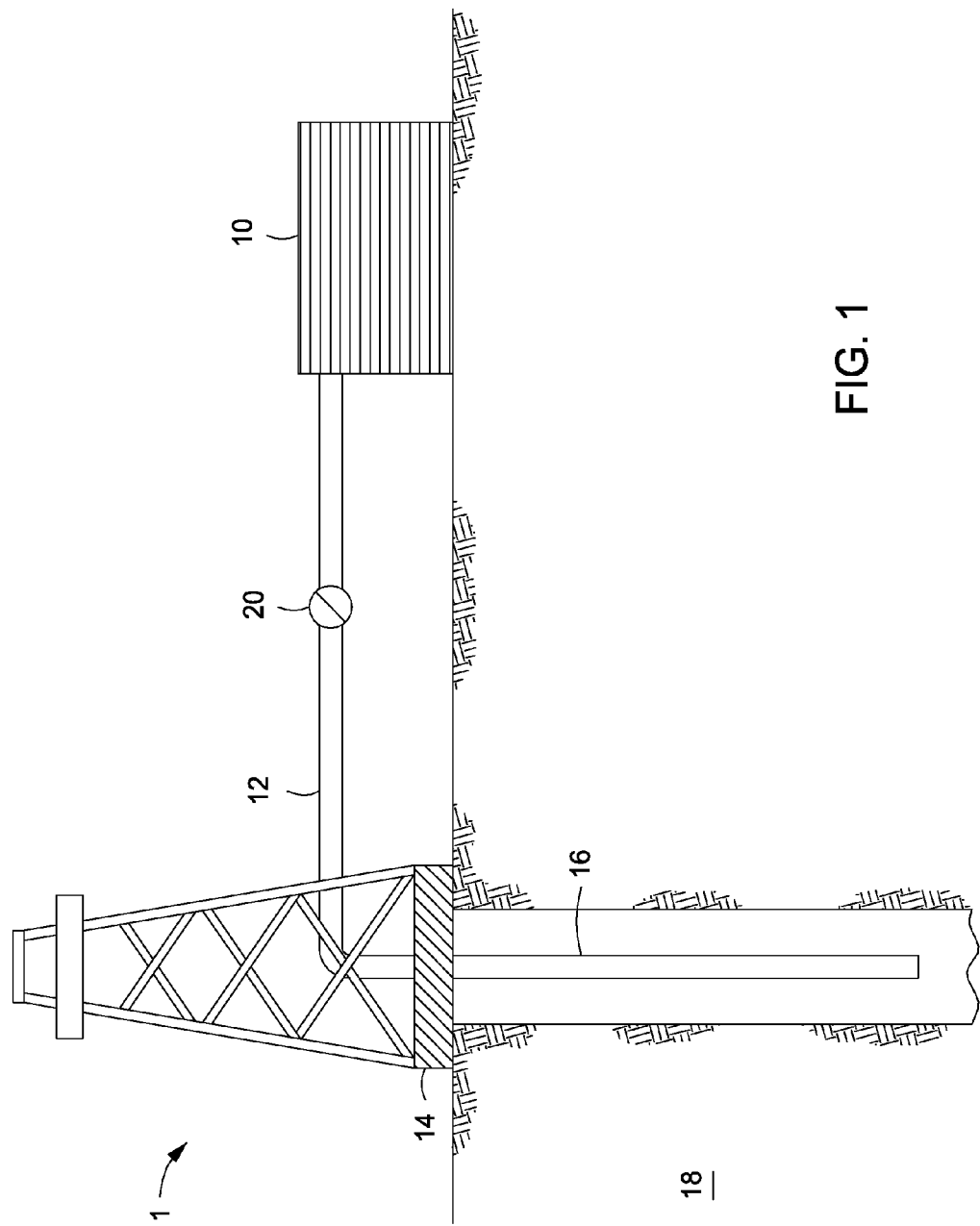
FIG. 1 shows an illustrative schematic of a system that can deliver fluid loss control packages of the present disclosure to a downhole location, according to one or more embodiments of the present disclosure.

The present disclosure relates to subterranean formation operations and, more particularly, to fluid loss control packages for use in subterranean formation operations.

The present disclosure describes the use of a treatment fluid comprising a fluid loss control package (FLCP). The FLCP of the present disclosure may be used in any subterranean formation operation in which fluid loss is desirably controlled, such as to ensure that treatment fluids reach a particular location within the formation, or to divert fluids to particular locations within the formation. In some embodiments, such formation operations include, but are not limited to, drilling operations, hydraulic fracturing operations, gravel-packing operations, frac-packing operations, and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The FLCPs of the present disclosure comprise a synergistic combination of rigid non-degradable particulates and pliable degradable particulates. As used herein, the term "rigid non-degradable particulates" encompasses particulates that are non-degradable and do not deform upon encountering stress and/or elevated temperature in a subterranean formation. The term does not mean that the rigid non-degradable particulates cannot crush into undistinguishable elements given a substantial amount of pressure, but merely that they do not deform (i.e., do not adopt a distorted or misshapen form) under typical stress and/or elevated temperature conditions in a subterranean formation. On the other hand, the term "pliable degradable particulates" encompasses particulates that are degradable and that do deform upon encountering stress and/or elevated temperature in a subterranean formation.

The synergistic combination of the rigid non-degradable particulates and the pliable degradable particulates in the FLCP, discussed in greater detail herein, enhance fluid loss control and diversion operations of other fluids within the wellbore by forming a stable, degradable "sealant." That is, the FLCP can form a fluidic seal to prevent the influx and also efflux of fluid to and from a subterranean formation. As used herein, the term "fluidic seal" refers to a barrier to migration of fluid, where the barrier has a permeability of less than about 0.1 darcies. That is, the fluidic seal may reduce permeability to less than about 0.1 darcies, or prevent permeability completely such that no fluid passes through the fluidic seal.

After the desired fluidic seal is formed and its use realized (e.g., as a diverting fluidic seal), the treatment fluid is flowed back to the surface from the wellbore. Thereafter, a formation fluid is produced from the formation. As used herein, the term "formation fluid" refers to any fluid produced from the subterranean formation (e.g., into the wellbore) that is not an introduced treatment fluid (i.e., a treatment fluid introduced by an operator and not naturally occurring). Additionally, after the desired fluidic seal is formed and its use realized, the pliable degradable particulates can be degraded to enhance the breakdown and removal of at least a portion of the fluidic seal. As used herein, the term "at least a portion" with reference to the breakdown and removal of the fluidic seal refers to restoring the target interval in which the fluidic seal was formed to a permeability no less than about 75% of the original permeability of the target zone.

The treatment fluid flow back and the production of the formation fluid may wholly occur prior to degrading the pliable degradable particulates, thus ensuring that the fluidic seal remains in place during production. In other embodiments, it may be desirable for the pliable degradable particulates to begin degradation during the treatment fluid flow back and production of the formation fluid, such that the degraded pliable degradable particulates are removed from the formation with the flow back treatment fluid and/or the production of the formation fluid. In such embodiments, complete degradation during the flow back and production stages may be acceptable, without departing from the scope of the present disclosure. In yet other embodiments, the degradation of the pliable degradable particulates may begin during the production of the formation fluids, such that the degraded pliable degradable particulates are removed during the production stage. In such embodiments, as well, complete degradation of the pliable degradable particulates may occur during the production phase. These embodiments are critical to the methods of the present disclosure at least because they permit removal of the degraded pliable degradable particulates from the wellbore without the need to perform a separate removal step. That is, the flow back of the treatment fluid and the production of formation fluids are both typical operations and no subsequent operation is required to breakdown and remove at least a portion of the fluidic seal.

The fluidic seal formed by the FLCP of the present disclosure may be in the form of a temporary filtercake (i.e., because the pliable degradable particulates allow its removal) formed on a surface within the wellbore. As used herein, the term "filtercake" refers to residue deposited on a permeable medium when a slurry, such as the treatment fluids comprising the FLCP described herein, is forced through the permeable medium. Such surfaces in which the FLCP temporary filtercake fluidic seals may be formed include a packed proppant pack surface (including any proppant mass, such as proppant layers (e.g., mono- and multi-layers)), a formation wall surface, a fracture face surface, and any combination thereof. As used herein, the terms "formation wall" and "formation wall surface" refer to exposed portions of a subterranean formation in a wellbore (e.g., horizontal, vertical, or deviated) available for contact with a treatment fluid. The terms "fracture face" and "fracture face surface" are forms of a formation wall surface, but represent surfaces within a natural or created fracture (including microfractures, fissures, and the like) that are available for contact with a treatment fluid.

The fluidic seal of the present disclosure formed by the FLCP may be formed in any desirable treatment target interval within a subterranean formation. Such target intervals may be those areas that are particularly prone to fluid loss during one or more operations. For example, the target interval for the fluidic seal may be an opening in the formation including, but not limited to, a perforation (including a cluster of perforations), a mouth of a propped fraction, a mouth of an un-propped fracture, and any combination thereof. The term "perforation" includes perforations into the formation created by perforation charges, as well as those created by other means, such as by jetting tools; the term further includes a single perforation, a cluster of perforations, or multiple clusters of perforations. The term "mouth" with reference to a fracture, whether propped or un-propped, refers to the initial fracturing opening point. For example, the mouth of a fracture formed from the wellbore will be located at the wellbore wall location, whereas the mouth of a fracture extending from another fracture will be located at the wall of the fracture from which it extends. Accordingly, the term refers to the mouth of any fracture, regardless of size, regardless of its initial starting point, and regardless of its orientation with reference to the wellbore itself. That is, the methods of the present disclosure apply equally to fluid loss control in complex fracture networks having multiple interconnected fractures.

The FLCP of the present disclosure accordingly comprises rigid non-degradable particulates and pliable degradable particulates, and is included in a treatment fluid with a base fluid. The treatment fluid is then introduced into a subterranean formation and the FLCP forms a fluidic seal in the subterranean formation at a target interval therein, thus providing fluid loss control. Advantages of the FLCP described herein, including those listed above, include reducing operation costs as certain rigid non-degradable and/or pliable degradable particulates may be readily available (e.g., natural sand), increasing economic feasibility of treating long formation intervals and/or the use of large treatment fluid volumes comprising the FLCP, providing a more effective fluid loss control system while maintaining degradation and clean-up performance from the formation, and the like. Indeed, as discussed in detail below, a much reduced amount of degradable materials for forming the fluidic seals described herein can be used, and thus the often high costs of degradable materials can be reduced. Instead, they are replaced with the relatively low cost materials including natural sand, microparticulates, and/or microfibers (collectively the rigid non-degradable materials). For example, as much as 70-80% of degradable materials may be replaced by the rigid non-degradable materials while enhancing fluid loss control properties.

The FLCP of the present disclosure comprises a combination of rigid non-degradable materials and pliable degradable materials. As previously, discussed, the rigid non-degradable materials do not deform under stresses and temperatures experienced in subterranean formations, whereas the pliable degradable particulates do deform under stresses and temperatures experienced in subterranean formations. The rigidity or deformation of these particulates may depend on a number of factors including, but not limited to, the particular subterranean formation being treated and the conditions thereof (e.g., pressures, temperatures, and the like), the particular material chosen for each particulate, and the like.

The particle distribution of the two types of particulates in the FLCP alone and in combination is critical to the embodiments described herein and may depend on a number of factors including, but not limited to, the size of the loss zone in which a fluidic seal is desired, the shape of the loss zone in which a fluidic seal is desired, the duration of the fluidic seal to be maintained, the conditions of the subterranean formation (e.g., temperature, salinity, pressure, etc.) that may affect the duration of the fluidic seal, and the like, and combinations thereof. In some embodiments, the rigid non-degradable particulates are present in the treatment fluid in a ratio to the pliable degradable particulates (rigid non-degradable particulates:pliable degradable particulates) in an amount of from about 1:1 to about 50:1, encompassing any value and subset therebetween. Accordingly, in some embodiments the rigid non-degradable particulates:pliable degradable particulates may be present in an amount of from about 1:1 to about 10:1, or about 10:1 to about 20:1, or about 20:1 to about 30:1, or about 30:1 to about 40:1, or about 40:1 to about 50:1, encompassing any value and subset therebetween. Generally, thus, the amount of pliable degradable particulates is greater than the amount of rigid non-degradable particulates; however, such an amount is dependent on the various factors described previously.

Regardless of the specific ratio of rigid non-degradable particulates to pliable degradable particulates, the total concentration of particulates in the FLCP may be in the range of about 0.01% to about 10% weight by weight (w/w) of the liquid portion of the treatment fluid, encompassing every value and subset therebetween. For example, the total concentration of particulates in the FLCP may be in the range of about 0.01% to about 0.5%, or about 0.5% to about 2%, or about 2%, to about 4%, or about 4% to about 6%, or about 6% to about 8%, or about 8% to about 10%, or about 0.5% to about 8%, or about 2% to about 8%, or about 4% to about 6% w/w of the liquid portion of the treatment fluid, encompassing any value and subset therebetween. In some embodiments, a lower range of about 0.1% to about 2% w/w of the liquid portion of the treatment fluid may be desirable, encompassing any value and subset therebetween. Each of these values is critical to the embodiments of the present disclosure and may depend on a number of factors including, but not limited to, the size, shape, and nature of the target interval to which the fluidic seal is to be applied, the types and sizes of the FLCP particulates used, the type of subterranean formation operation being performed, and the like, and combinations thereof.

The rigid non-degradable particulates for use in the embodiments of the present disclosure include readily available particulates that can drastically decrease the cost of the subterranean formation operation being performed with the treatment fluid comprising the FLCP, and moreover uses a combination of particulates to achieve enhanced fluidic sealing. Such rigid non-degradable particulates include, but are not limited to, a combination of natural sand and microparticulates; a combination of natural sand and microfibers; or a combination of natural sand, microparticulates, and microfibers.

As used herein, the term "natural sand," refers to naturally occurring granular material composed of rock and mineral particles. The natural sand described herein may have an average particle size diameter of from about 75 micrometers ($\mu$m) to about 840 $\mu$m, encompassing any value and subset therebetween. As used herein, the term "particle size diameter" refers to the measure of a straight line passing through the center of a particulate, regardless of its shape, across the largest dimension thereof. For example, the natural sand may have an average particle size diameter of about 75 $\mu$m to about 228 $\mu$m, or about 228 $\mu$m to about 381 $\mu$m, or about 381 $\mu$m to about 534 $\mu$m, or about 534 $\mu$m to about 687 $\mu$m, or about 687 $\mu$m to about 840 $\mu$m, encompassing any value and subset therebetween.

As used herein, the term microparticulates refers to particles that are substantially spherical or polygonal (e.g., cuboid, pyramidal, and the like) and have an average particle size diameter within the micrometer range. The term "substantially spherical" refers to a material that has a morphology that includes spherical geometry and elliptic geometry, including oblong spheres, ovoids, ellipsoids, capsules, platelets, and the like and may have surface irregularities. In some embodiments, the microparticulates are preferably within the low end of the micrometer range to enhance the formation of the fluidic seal. For example, in some embodiments, the microparticulates have an average particle size diameter of about 0.1 $\mu$m to about 150 $\mu$m, encompassing any value and subset therebetween. For example, in some embodiments, the microparticulates have an average particle size diameter of about 0.1 $\mu$m to about 30 $\mu$m, or about 30 $\mu$m to about 60 $\mu$m, or about 60 $\mu$m to about 90 $\mu$m, or about 90 $\mu$m to about 120 $\mu$m, or about 120 $\mu$m to about 150 $\mu$m, encompassing any value and subset therebetween.

As used herein, the term "microfibers" refers to fiber-shaped substances having aspect ratios of greater than about 5, to an unlimited upper limit. Suitable microfibers for use in the embodiments herein may, for example, have an average particle size diameter in the range of about 1 μm to about 150 μm, encompassing any value and subset therebetween. For example, the average particle size diameter of the microfibers may be about 1 μm to about 38 μm, or about 38 μm to about 66 μm, or about 66 μm to about 94 μm, or about 94 μm to about 122 μm, or about 122 μm to about 150 μm, encompassing any value and subset therebetween. The length of the microfibers for use as a portion of the rigid non-degradable particulates in the FLCP may be in the range of an average length of from about 100 μm to about 10000 μm, encompassing any value and subset therebetween. For example, the average length of the microfibers may be about 100 μm to about 2000 μm, or about 2000 μm to about 4000 μm, or about 4000 μm to about 6000 μm, or about 6000 μm to about 8000 μm, or about 8000 μm to about 10000 μm, encompassing any value and subset therebetween.

Each of the values described above with reference to the rigid non-degradable particulates is critical to the embodiments of the present disclosure and may depend on a number of factors including, but not limited to, the particular makeup of the FLCP, the conditions of the subterranean formation being treated (e.g., temperature, pressure, and the like), the conditions of the treatment interval in the subterranean formation being treated (e.g., permeability, porosity, and the like), and the like, and any combination thereof.

As mentioned, the natural sand for use as the rigid non-degradable particulates in the FLCP are naturally formed granules of rock and minerals. The microparticulates may include, but are not limited to, silica flour (e.g., 325-U.S. Sieve Mesh silica flour, or 200-U.S. Sieve Mesh silica flour), fly ash, a ceramic, glass, a rigid non-degradable polymer, a metal, a non-metallic mineral, and any combination thereof. Suitable ceramics for use in forming the rigid non-degradable particulates include crystalline and noncrystalline ceramics including, but not limited to, carbides (e.g., silicon carbide), oxides (e.g., alumina, beryllia, ceria, zirconia), nitrides (e.g., silicon nitride), borides, silicides, and the like, and any combination thereof. Fly ash may be a particularly suitable material for forming the microparticulates described herein. An example of a commercially available ceramic for use as a microparticulate includes ZEEOSPHERES™ ceramic mircospheres available from Zeeospheres Ceramics, LLC in Lockport, La., Suitable ZEEOSPHERES™ may include, for example, ZEEOSPHERES™ N-1000 or ZEEOSPHERES™ N-200.

Glass materials may be used as the microparticulates and/or the microfibers described herein, provided that they meet the rigid definition of the present disclosure. Suitable commercially available glass material include 3M™ Glass Bubbles, such as HGS10000 and/or HGS18000, available from 3M Company in St. Paul, Minn. Rigid non-degradable polymers may also be used as the microparticulates or the microfibers for use as the rigid non-degradable particulates in the FLCP described herein. Such rigid non-degradable polymers include, but are not limited to, a plastic bead, Poly[imino(1,6-dioxohexamethylene) iminohexamethylene] (Nylon 66), polystyrene, a polyurethane, a polysulfone, poly(ether ketone), an aromatic polyester, a thermoplastic (e.g., polypropylene, polyethylene, polyvinyl chloride, and the like), and any combination thereof.

Suitable metals for forming the microparticulates and/or the microfibers may include, but are not limited to, alkali earth metals, alkaline earth metals, transition metals, post-transition metals, lanthanides, actinides, germanium, antimony, and any combination thereof. Suitable non-metallic minerals may include, but are not limited to, hematite, specular hematite, magnetite, pyrite, orthoclase, pyroxene, amphibole, sodic plagioclase, calcic plagioclase, microcline, garnet, topaz, corundum, beryl, epidote, olivine, biotite, hornlende, potassium feldspar, and any combination thereof.

As mentioned, the particle size and amount distribution of the rigid non-degradable particulates and pliable degradable particulates is of critical importance to the embodiments described herein and the effectiveness of the fluidic seal formed with the FLCP. Similarly, the combination and types of rigid non-degradable particulate types is also critical and can influence the effectiveness of the fluidic seal, the strength of the fluidic seal against pressures encountered in a formation, and the like. As a specific example, the rigid non-degradable particulates in the FLCP may be a combination of natural sand and microparticulates, where the natural sand is in the range of from about 25% to about 75% by weight of the rigid non-degradable particulates, and the microparticulates are in the range of from about 25% to about 75% by weight of the rigid non-degradable particulates, encompassing any value and subset therebetween. Accordingly, for a single FLCP, the natural sand may be in an amount of from about 25% to 35%, or about 35% to about 45%, or about 45% to about 55%, or about 55% to about 65%, or about 65% to about 75% by weight of the rigid non-degradable particulates, and simultaneously, the microparticulates may be in an amount of from about 25% to 35%, or about 35% to about 45%, or about 45% to about 55%, or about 55% to about 65%, or about 65% to about 75% by weight of the rigid non-degradable particulates, encompassing any value and subset therebetween.

As another example, the rigid non-degradable particulates in the FLCP are a combination of natural sand and microfibers, where the natural sand is in the range of from about 50% to about 75% by weight of the rigid non-degradable particulates, and the microfibers are in the range of from about 25% to about 50% by weight of the rigid non-degradable particulates, encompassing any value and subset therebetween. Accordingly, for a single FLCP, the natural sand may be in an amount of from about 50% to about 55%, or about 55% to about 60%, or about 60% to about 65%, or about 65% to about 70%, or about 70% to about 75% by weight of the rigid non-degradable particulates, and simultaneously, the microfibers may be in an amount of from about 25% to about 30%, or about 30% to about 35%, or about 35% to about 40%, or about 40% to about 45%, or about 45% to about 50% by weight of the rigid non-degradable particulates, encompassing any value and subset therebetween.

As yet another example, in some embodiments, the rigid non-degradable particulates in the FLCP are a combination of natural sand, microparticulates, and microfibers, where the natural sand is present in an amount of from about 10% to about 50% by weight of the rigid non-degradable particulates, the microparticulates are present in an amount of from about 10% to about 50% by weight of the rigid non-degradable particulates, and the microfibers are present in an amount of from about 10% to about 50% by weight of the rigid non-degradable particulates, encompassing any value and subset therebetween. That is, for a single FLCP, the natural sand may be in an amount of from about 10% to about 18%, or about 18% to about 26%, or about 26% to about 34%, or about 34% to about 42%, or about 42% to about 50% by weight of the rigid non-degradable particulates; the microparticulates may be in an amount of from about 10% to about 18%, or about 18% to about 26%, or about 26% to about 34%, or about 34% to about 42%, or about 42% to about 50% by weight of the rigid non-degradable particulates; and the microfibers may be in an amount of from about 10% to about 18%, or about 18% to about 26%, or about 26% to about 34%, or about 34% to about 42%, or about 42% to about 50% by weight of the rigid non-degradable particulates, encompassing any value and subset therebetween.

Each of the above values for amounts of natural sand, microparticulates, and microfibers making up the rigid non-degradable particulates of the present disclosure for use in the FLCP are critical to the embodiments of the present disclosure. Such critical values depend on a number of factors including, but not limited to, the types of rigid non-degradable particulates selected, the materials forming the rigid non-degradable particulates selected, the conditions of the subterranean formation, the condition of the treatment interval to be treated (e.g., permeability, porosity, and the like), and the like, and combinations thereof.

The pliable degradable particulates of the present invention may be sized similarly to the substantially spherical rigid non-degradable particulates of the FLCP to facilitate packing between the two types of particulates to form the fluidic seal described herein. Moreover, the pliable degradable particulates, like the microparticulates previously described, may be substantially spherical in shape or polygonal, without departing from the scope of the present disclosure. In some embodiments, the average particle size diameter of the pliable degradable particulates is in the range of about 10 µm to about 200 µm, encompassing any value and subset therebetween. For example, the pliable degradable particulates for use in forming the FLCP may be of from about 10 µm to about 48 µm, or about 48 µm to about 86 µm, or about 86 µm to about 124 µm, or about 124 µm to about 162 µm, or about 162 µm to about 200 µm, encompassing any value and subset therebetween. Moreover, the pliable degradable particulates may comprise a multimodal particle size distribution, for example, bimodal or trimodal particle size distributions. In such embodiments, the pliable degradable particulates comprising a multimodal distribution may have an average particle size diameter in the range of about 25 µm to about 175 µm, or about 50 µm to about 150 µm, or about 75 µm to about 125 µm, encompassing any value and subset therebetween.

Each of these values, like those of the rigid non-degradable particulates, is critical to the embodiments of the present disclosure and depend on a number of factors including, but not limited to, the type of pliable degradable particulate(s) selected, the shape of pliable degradable particulate(s) selected, the type of rigid non-degradable particulates selected, the conditions of the subterranean formation, the conditions of the target interval where the fluidic seal is to be formed, and the like, and combinations thereof.

In some embodiments, the pliable degradable particulates are degradable polymers comprising at least one carboxylic acid-derived (i.e., —COO—) functional group on the polymer backbone. Examples of suitable degradable polymers that may be used as the pliable degradable particulates described herein include, but are not limited to, aliphatic polyesters, poly(lactides), poly(glycolides), poly(ε-caprolactones), poly(hydroxy ester ethers), poly(hydroxybutyrates), poly(anhydrides), poly(carbonates), poly(ether esters), poly(ester amides), poly(carbamates), polyvinyl alcohol, polyvinyl acetate, poly(propylene oxide), polysaccharides, chitin, chitosan, proteins, aliphatic poly(carbonates), poly(ortho esters), poly(amino acids), poly(ethylene oxide), polyphosphazenes, amines, polyamines, poly(hydroxyl ester ethers), and any combination thereof. Copolymers, blends, derivatives, or combinations of any of foregoing degradable polymers are also suitable.

The term "derivative" is defined herein to include any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "copolymer," as used herein, is not limited to copolymerization of a combination of two monomers, but includes any combination of any number of monomers (e.g., graft polymers, terpolymers, and the like). For example, suitable copolymers may include an aliphatic polyester that is grafted with polyethylene oxide or polyacrylamide, or block polymers containing one or more blocks containing a carboxy (—COO—) group and another block containing non-carboxy containing polymer segment such as polyamide, poly(alkylene oxide), poly(anhydride), polyacrylamide, or poly(2-acrylamido-2-methylpropane sulfonic acid).

As stated above, the degradable polymer for use as the pliable degradable particulate may comprise one or more carboxy groups (—COO—) that are subject to hydrolytic and/or aminolytic degradation, such as the aliphatic polyester, poly(lactic acid) (PLA). In embodiments in which the degradable polymer is PLA, the PLA may have been synthesized from lactic acid by a condensation reaction or, more commonly, by ring-opening polymerization of cyclic lactide monomer. Since both lactic acid and lactide can achieve the same repeating unit, the general term "poly(lactic acid)," as used herein, refers to a polymer made from lactides, lactic acid, or oligomers, without reference to the degree of polymerization. The lactide monomer exists generally in three different forms: two stereoisomers L- and D-lactide and racemic D,L-lactide (meso-lactide).

The chirality of the lactide units provides a means to adjust, among other things, degradation rates, as well as physical and mechanical properties. Poly(L-lactide), for instance, is a semicrystalline polymer with a relatively slow hydrolysis rate. This may be desirable in applications of the present disclosure where a slower degradation of the degradable polymers is desired, such as to delay removal of the fluidic seal formed by the FLCP. Poly(D,L-lactide) may be a more amorphous polymer with a resultant faster hydrolysis rate. This may be suitable for other applications where a more rapid degradation may be appropriate, such as to more quickly remove the fluidic seal. The stereoisomers of lactic acid may be used individually or combined to be used in accordance with the present disclosure. Additionally, they may be copolymerized with, for example, glycolide or other monomers like ε-caprolactone, 1,5-dioxepan-2-one, trimethylene carbonate, or other suitable monomers to obtain polymers with different properties or degradation times. The lactic acid stereoisomers can be modified to be used in the present disclosure by, among other things, blending, copolymerizing or otherwise mixing the stereoisomers; by blending, copolymerizing or otherwise mixing high and low molecular weight PLA; or by blending, copolymerizing or otherwise mixing a PLA with another polyester or polyesters.

Plasticizers may be included in the degradable polymers used as the pliable degradable particulates in the FLCP. The plasticizers may be present in an amount sufficient to provide characteristics that may be desired, for example, to provide tackiness of the degradable polymers, to provide improved melt processability, or to improve their deformability for use in forming the fluidic seal in combination with the rigid non-degradable particulates. In addition, the plasticizers may enhance the degradation rate of the degradable polymers. The plasticizers, if used, are at least intimately incorporated within the degradable polymers.

An example of a suitable plasticizer for poly(lactic acid) may include oligomeric lactic acid. Other specific examples of plasticizers for use with the degradable polymers forming the pliable degradable particulates include, but are not limited to, polyethylene glycol (PEG); polyethylene oxide; oligomeric lactic acid; citrate esters (such as tributyl citrate oligomers, triethyl citrate, acetyltributyl citrate, and acetyltriethyl citrate); glucose monoesters; partially hydrolyzed fatty acid esters; PEG monolaurate; triacetin; poly($\epsilon$-caprolactone); poly(hydroxybutyrate); glycerin-1-benzoate-2,3-dilaurate; glycerin-2-benzoate-1,3-dilaurate; bis(butyl diethylene glycol)adipate; ethylphthalylethyl glycolate; glycerin diacetate monocaprylate; diacetyl monoacyl glycerol; polypropylene glycol (and epoxy derivatives thereof); poly(propylene glycol)dibenzoate; dipropylene glycol dibenzoate; glycerol; ethyl phthalyl ethyl glycolate; poly(ethylene adipate)distearate; di-iso-butyl adipate; and any combination thereof.

The choice of an appropriate plasticizer will depend on the particular degradable polymer utilized, as well as the desired degree of pliability. In some embodiments, the plasticizer may be present in an amount of from about 0.1% to about 5% w/w of the degradable polymer forming the pliable degradable particulates in the FLCP described herein, encompassing any value and subset therebetween. For example, the plasticizer may be present of from about 0.1% to about 0.5%, or about 0.5% to about 1%, or about 1% to about 2%, or about 2% to about 3%, or about 3% to about 4%, or about 4% to about 5%, or about 0.5% to about 4.5%, or about 1% to about 4%, or about 1.5% to about 3.5%, or about 2% to about 3% w/w of the degradable polymer forming the pliable degradable particulates in the FLCP, encompassing any value and subset therebetween.

The treatment fluids comprising the FLCP of the present disclosure include a base fluid. Suitable base fluids for use in conjunction with embodiments of the present disclosure may include, but not be limited to, oil base fluids, aqueous base fluids, aqueous-miscible base fluids, water-in-oil emulsion base fluids, or oil-in-water emulsion base fluids. In preferred embodiments, the base fluids for use in the embodiments described herein are aqueous base fluid or aqueous-miscible base fluids. Suitable oil base fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous base fluids may include, but are not limited to, fresh water, saltwater (e.g., water containing one or more salts dissolved therein), brine (e.g., saturated salt water), seawater, produced water (e.g., water produced from a formation as a byproduct along with oil and gas), waste water (e.g., treated or untreated water adversely affected by anthropogenic influence), and any combination thereof.

Suitable aqueous-miscible base fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsion base fluids, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, encompassing any value and subset therebetween. Suitable oil-in-water emulsion base fluids may have a water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, encompassing any value and subset therebetween. It should be noted that for water-in-oil and oil-in-water emulsions, any mixture of the above may be used including the water being and/or comprising an aqueous-miscible fluid.

In some embodiments, the treatment fluid may be a slickwater fluid or a gelled fluid. As used herein, the term "slickwater" refers to a treatment fluid having chemicals added to increase the fluid flow. Accordingly, to create one or both of slickwater or a gelled fluid (i.e., having increased viscosity, such as for suspending particulates), the treatment fluid described herein may further comprise a flow increasing agent (e.g., a lubricant), a gelling agent, a crosslinker, and any combination thereof.

In other embodiments, the treatment fluid may further comprise additives for use in performing particular operations or for use in particular subterranean formations to enhance operations. Such additives may be included provided that they do not interfere with the ability of the FLCP to form a fluidic seal. Suitable additives may include, but are not limited to, a resin, a tackifying agent, a curable resin, a salt, a weighting agent, an inert solid, an emulsifier, a dispersion aid, a corrosion inhibitor, an emulsion thinner, an emulsion thickener, a surfactant, a lost circulation material, a foaming agent, a gas, a pH control additive, a breaker, a biocide, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids comprising the FLCP described herein to a downhole location are described, such as during a hydraulic fracturing operation, a frac-packing operation, and/or a gravel packing operation. In various embodiments, the systems can comprise a pump fluidly coupled to a tubular, the tubular containing a treatment fluid comprising a base fluid and a FLCP comprising rigid non-degradable particulates and pliable degradable particulates.

The pump may be a high-pressure pump in some embodiments. As used herein, the term "high pressure pump" will refer to a pump that is capable of delivering a fluid downhole at a pressure of about 1000 psi or greater. A high-pressure pump may be used when it is desired to introduce the treatment fluid to a subterranean formation at or above a fracture gradient of the subterranean formation, but it may also be used in cases where fracturing is not desired. In some embodiments, the high-pressure pump may be capable of fluidly conveying particulate matter, such as proppant particulates, into the subterranean formation. Suitable high-pressure pumps will be known to one having ordinary skill in the art and may include, but are not limited to, floating piston pumps and positive displacement pumps.

In other embodiments, the pump may be a low-pressure pump. As used herein, the term "low pressure pump" will refer to a pump that operates at a pressure of about 1000 psi or less. In some embodiments, a low-pressure pump may be fluidly coupled to a high-pressure pump that is fluidly coupled to the tubular. That is, in such embodiments, the low-pressure pump may be configured to convey the treatment fluid to the high-pressure pump. In such embodiments, the low-pressure pump may "step up" the pressure of the treatment fluid before it reaches the high-pressure pump.

In some embodiments, the systems described herein can further comprise a mixing tank that is upstream of the pump and in which the treatment fluid is formulated. In various embodiments, the pump (e.g., a low-pressure pump, a high-pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. In some instances, tubular 16 may have a plurality of orifices (not shown) through which the treatment fluid of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may be recovered and used in a different subterranean formation, a different operation, or a different industrial application.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A: A method comprising: introducing a treatment fluid into a subterranean formation, wherein the treatment fluid comprises a base fluid and a fluid loss control package (FLCP), the FLCP comprising rigid non-degradable particulates and pliable degradable particulates; and forming a fluidic seal with the FLCP in the subterranean formation at a target interval, thereby providing fluid loss control therein.

Embodiment A may have one or more of the following additional elements in any combination:

Element A1: Wherein the fluidic seal has a permeability of less than about 0.1 darcies.

Element A2: Further comprising degrading the pliable degradable particulates to enhance the breakdown and removal of at least a portion of the fluidic seal.

Element A3: Further comprising flowing back the treatment fluid and producing a formation fluid from the subterranean formation, and during flow back of the treatment fluid and the production of the formation fluid, degrading the pliable degradable particulates to enhance the breakdown and removal of least a portion of the fluidic seal, wherein the degraded pliable degradable particulates are removed from the subterranean formations with the flow back of the treatment fluid and/or with the production of the formation fluid.

Element A4: Wherein the fluidic seal is a temporary filtercake formed on a surface selected from the group consisting of a packed proppant pack, formation wall, a fracture face, and any combination thereof.

Element A5: Wherein the fluidic seal is formed in an opening selected from the group consisting of a perforation, a mouth of a propped fracture, a mouth of an un-propped fracture, and any combination thereof.

Element A6: Wherein the fluidic seal is formed during a subterranean formation operation selected from the group consisting of a drilling operation, a hydraulic fracturing operation, a gravel-packing operation, a frac-packing operation, and any combination thereof.

Element A7: Wherein the rigid non-degradable particulates and the pliable degradable particulates are present in the treatment fluid in a ratio of the rigid non-degradable particulates to pliable degradable particulates in an amount of from about 1:1 to about 50:1.

Element A8: Wherein the rigid non-degradable particulates are a combination of natural sand and microparticulates; a combination of natural sand and microfibers; or combination of natural sand, microparticulates, and microfibers.

Element A9: Wherein the rigid non-degradable particulates are a combination of natural sand and microparticulates; a combination of natural sand and microfibers; or combination of natural sand, microparticulates, and microfibers, and wherein the microparticulates and the microfibers are composed of a material selected from the group consisting of silica flour, fly ash, a ceramic, glass, a rigid non-degradable polymer, a metal, a non-metallic mineral, and any combination thereof.

Element A10: Wherein the rigid non-degradable particulates are a combination of natural sand and microparticulates; a combination of natural sand and microfibers; or combination of natural sand, microparticulates, and microfibers, and wherein the natural sand has an average particle size diameter of from about 75 micrometers to about 840 micrometers, the microparticulates have an average particle size diameter of from about 0.1 micrometer to about 150 micrometers, and the microfibers have an average particle size diameter of from about 1 micrometers to about 150 micrometers, and an average length of from about 100 micrometers to about 10000 micrometers.

Element A11: wherein the rigid non-degradable particulates are a combination of natural sand and microparticulates, and wherein the natural sand is in an amount of from about 25% to about 75% by weight of the rigid non-degradable particulates, and the microparticulates are in an amount of from about 25% to about 75% by weight of the rigid non-degradable particulates.

Element A12: Wherein the rigid non-degradable particulates are a combination of natural sand and microfibers, and wherein the natural sand is in an amount of from about 50% to about 75% by weight of the rigid non-degradable particulates, and the microfibers are in an amount of from about 25% to about 50% by weight of the rigid non-degradable particulates.

Element A13: wherein the rigid non-degradable particulates are a combination of natural sand, microparticulates, and microfibers, and wherein the natural sand is in an amount of from about 10% to about 50% by weight of the rigid non-degradable particulates, the microparticulates are in an amount of from about 10% to about 50% by weight of the rigid non-degradable particulates, and the microfibers are in an amount of from about 10% to about 50% by weight of the rigid non-degradable particulates.

Element A14: Wherein the pliable degradable particulates are degradable polymers comprising a polymeric backbone having at least one carboxylic acid-derived functional group.

Element A15: Wherein the pliable degradable particulates are degradable polymers selected from the group consisting of an aiphatic polyester, a poly(lactide), a poly(glycolide), a poly(ε-caprolactone), a poly(hydroxyl ester ether), a poly(hydroxybutyrate), a poly(anhydride), a poly(carbonate), a poly(ether ester), a poly(ester amide), a poly(carbamate), a polyvinyl alcohol, a polyvinyl acetate, a poly(propylene oxide), a polysaccharide, a chitin, a chitosan, a protein, an aliphatic poly(carbonate), a poly(ortho ester), a poly(amino acid), a poly(ethylene oxide), a polyphosphazene, an amine, a polyamine, a poly(hydroxyl ester ether), and any combination thereof.

Element A16: Wherein the pliable degradable particulates have an average particle size diameter of from about 1 micrometers to about 200 micrometers.

Element A17: Wherein the treatment fluid further comprises a fluid modifier selected from the group consisting of a gelling agent, a crosslinker, a flow increasing agent, and any combination thereof.

By way of non-limiting example, exemplary element combinations applicable to Embodiment A include: A1-A17; A1, A4, and A16; A9 and A10; A13, A16, and A17; A2, A4, and A7; A5 and A8; A3, A5, A11, and A13; A12 and A17; A4, A6, A14, and A15; and the like.

Embodiment B: A system comprising: a tubular extending from a wellhead and into a subterranean formation; and a pump fluidly coupled to the tubular, the pump containing a treatment fluid for forming a fluidic seal in the subterranean formation, thereby providing fluid loss control, the treatment fluid comprising: a base fluid and a fluid loss control package (FLCP), the FLCP comprising rigid non-degradable particulates and pliable degradable particulates.

Embodiment B may have one or more of the following additional elements in any combination:

Element B1: Wherein the rigid non-degradable particulates and the pliable degradable particulates are present in the treatment fluid in a ratio of the rigid non-degradable particulates to pliable degradable particulates in an amount of from about 1:1 to about 50:1.

Element B2: Wherein the rigid non-degradable particulates are a combination of natural sand and microparticulates; a combination of natural sand and microfibers; or combination of natural sand, microparticulates, and microfibers.

Element B3: Wherein the rigid non-degradable particulates are a combination of natural sand and microparticulates; a combination of natural sand and microfibers; or combination of natural sand, microparticulates, and microfibers, and wherein the microparticulates and the microfibers are composed of a material selected from the group consisting of silica flour, fly ash, a ceramic, glass, a rigid non-degradable polymer, a metal, a non-metallic mineral, and any combination thereof.

Element B4: Wherein the rigid non-degradable particulates are a combination of natural sand and microparticulates; a combination of natural sand and microfibers; or combination of natural sand, microparticulates, and microfibers, and wherein the natural sand has an average particle size diameter of from about 75 micrometers to about 840 micrometers, the microparticulates have an average particle size diameter of from about 0.1 micrometer to about 150 micrometers, and the microfibers have an average particle size diameter of from about 1 micrometers to about 150 micrometers, and an average length of from about 100 micrometers to about 10000 micrometers.

Element B4: wherein the rigid non-degradable particulates are a combination of natural sand and microparticulates, and wherein the natural sand is in an amount of from about 25% to about 75% by weight of the rigid non-degradable particulates, and the microparticulates are in an amount of from about 25% to about 75% by weight of the rigid non-degradable particulates.

Element B5: Wherein the rigid non-degradable particulates are a combination of natural sand and microfibers, and wherein the natural sand is in an amount of from about 50% to about 75% by weight of the rigid non-degradable particulates, and the microfibers are in an amount of from about 25% to about 50% by weight of the rigid non-degradable particulates.

Element B6: wherein the rigid non-degradable particulates are a combination of natural sand, microparticulates, and microfibers, and wherein the natural sand is in an amount of from about 10% to about 50% by weight of the rigid non-degradable particulates, the microparticulates are in an amount of from about 10% to about 50% by weight of the rigid non-degradable particulates, and the microfibers are in an amount of from about 10% to about 50% by weight of the rigid non-degradable particulates.

Element B7: Wherein the pliable degradable particulates are degradable polymers comprising a polymeric backbone having at least one carboxylic acid-derived functional group.

Element B8: Wherein the pliable degradable particulates are degradable polymers selected from the group consisting of an aiphatic polyester, a poly(lactide), a poly(glycolide), a poly($\epsilon$-caprolactone), a poly(hydroxyl ester ether), a poly(hydroxybutyrate), a poly(anhydride), a poly(carbonate), a poly(ether ester), a poly(ester amide), a poly(carbamate), a polyvinyl alcohol, a polyvinyl acetate, a poly(propylene oxide), a polysaccharide, a chitin, a chitosan, a protein, an aliphatic poly(carbonate), a poly(ortho ester), a poly(amino acid), a poly(ethylene oxide), a polyphosphazene, an amine, a polyamine, a poly(hydroxyl ester ether), and any combination thereof.

Element B9: Wherein the pliable degradable particulates have an average particle size diameter of from about 1 micrometers to about 200 micrometers.

Element B10: Wherein the treatment fluid further comprises a fluid modifier selected from the group consisting of a gelling agent, a crosslinker, a flow increasing agent, and any combination thereof.

By way of non-limiting example, exemplary element combinations applicable to Embodiment B include: B1-B10; B1, B4, B7, and B10; B2 and B3; B3, B7, and B9; B8 and B10; B2, B7, and B10; and the like.

Embodiment C: A treatment fluid comprising: a base fluid; and a fluid loss control package (FLCP), the FLCP comprising rigid non-degradable particulates and pliable degradable particulates, wherein the rigid non-degradable particulates and the pliable degradable particulates are present in the treatment fluid in a ratio of the rigid non-degradable particulates to pliable degradable particulates in an amount of from about 1:1 to about 50:1.

Embodiment C may have one or more of the following additional elements in any combination:

Element C1: Wherein the rigid non-degradable particulates are a combination of natural sand and microparticulates; a combination of natural sand and microfibers; or combination of natural sand, microparticulates, and microfibers.

Element C2: Wherein the rigid non-degradable particulates are a combination of natural sand and microparticulates; a combination of natural sand and microfibers; or combination of natural sand, microparticulates, and microfibers, and wherein the microparticulates and the microfibers are composed of a material selected from the group consisting of silica flour, fly ash, a ceramic, glass, a rigid non-degradable polymer, a metal, a non-metallic mineral, and any combination thereof.

Element C3: Wherein the rigid non-degradable particulates are a combination of natural sand and microparticulates; a combination of natural sand and microfibers; or combination of natural sand, microparticulates, and microfibers, and wherein the natural sand has an average particle size diameter of from about 75 micrometers to about 840 micrometers, the microparticulates have an average particle size diameter of from about 0.1 micrometer to about 150 micrometers, and the microfibers have an average particle size diameter of from about 1 micrometers to about 150 micrometers, and an average length of from about 100 micrometers to about 10000 micrometers.

Element C4: Wherein the rigid non-degradable particulates are a combination of natural sand and microparticulates, and wherein the natural sand is in an amount of from about 25% to about 75% by weight of the rigid non-degradable particulates, and the microparticulates are in an amount of from about 25% to about 75% by weight of the rigid non-degradable particulates.

Element C5: Wherein the rigid non-degradable particulates are a combination of natural sand and microfibers, and wherein the natural sand is in an amount of from about 50% to about 75% by weight of the rigid non-degradable particulates, and the microfibers are in an amount of from about 25% to about 50% by weight of the rigid non-degradable particulates.

Element C6: wherein the rigid non-degradable particulates are a combination of natural sand, microparticulates, and microfibers, and wherein the natural sand is in an amount of from about 10% to about 50% by weight of the rigid non-degradable particulates, the microparticulates are in an amount of from about 10% to about 50% by weight of the rigid non-degradable particulates, and the microfibers are in an amount of from about 10% to about 50% by weight of the rigid non-degradable particulates.

Element C7: Wherein the pliable degradable particulates are degradable polymers comprising a polymeric backbone having at least one carboxylic acid-derived functional group.

Element C8: Wherein the pliable degradable particulates are degradable polymers selected from the group consisting of an aiphatic polyester, a poly(lactide), a poly(glycolide), a poly($\epsilon$-caprolactone), a poly(hydroxyl ester ether), a poly(hydroxybutyrate), a poly(anhydride), a poly(carbonate), a poly(ether ester), a poly(ester amide), a poly(carbamate), a polyvinyl alcohol, a polyvinyl acetate, a poly(propylene oxide), a polysaccharide, a chitin, a chitosan, a protein, an aliphatic poly(carbonate), a poly(ortho ester), a poly(amino acid), a poly(ethylene oxide), a polyphosphazene, an amine, a polyamine, a poly(hydroxyl ester ether), and any combination thereof.

Element C9: Wherein the pliable degradable particulates have an average particle size diameter of from about 1 micrometers to about 200 micrometers.

Element C10: Wherein the treatment fluid further comprises a fluid modifier selected from the group consisting of a gelling agent, a crosslinker, a flow increasing agent, and any combination thereof.

By way of non-limiting example, exemplary element combinations applicable to Embodiment C include: C1-C10; C2, C4, and C7; C1, C6, and C10; C1, C2, C5, and C8; C7 and C9; C3, C4, and C6; C8 and C10; and the like.

To facilitate a better understanding of the embodiments of the present invention, the following example of preferred or representative embodiments is given. In no way should the following example be read to limit, or to define, the scope of the present disclosure.

EXAMPLE 1

In this example, the synergistic effect of the combination of the rigid non-degradable particulates and the pliable degradable particulates forming the FLCP described herein was evaluated for forming a fluidic seal based on differential pressure.

First, four Eagle Ford shale core samples (2.54-centimeters×5.08 centimeters) were prepared by scoring a groove parallel to the core's top plane. A chisel and hammer were used to split the cores vertically along the groove into two halves. After the cores were split, each half of each core was coated in EXPEDITE® 350 curable resin, available from Halliburton Energy Services, Inc. in Houston, Tex. and grains of 12/18-U.S. Sieve mesh ceramic proppant adhered to the curable resin. The halves of the cores were then joined together and placed in an oven at 93.3° C. (200° F.) until the halves were cured together and the ceramic proppant anchored therebetween. The combination of the EXPEDITE® 350 and the ceramic proppant simulate a propped fracture within a subterranean formation.

Each prepared core sample was tested by placing it into a Hassler-type sleeve core holder with a 2.54-centimeter metal ring spacer. The core holder was situated into a flow apparatus and heated to 79.4° C. (175° F.), an annular pressure of 1200 pounds per square inch (psi) was applied around the sleeve, and a back pressure of 200 psi was applied.

The differential pressure of various fluids was tested through the core samples. The fluids were prepared according to Table 1 below. Each fluid comprised a gelled fluid having a fresh water base fluid and 20 pounds per 1000 gallons of a natural gum gelling agent, WG-18™ available from Halliburton Energy Services, Inc., in Houston, Tex. Each of the fluids further comprised one or more of pliable degradable particulates of polylactic acid, rigid non-degradable particulates comprising 40/70 mesh natural sand, and microparticulates of ceramic The units "mL" are milliliters and "ppg" are pounds per gallon.

TABLE 1

|  | FLUID 1 | FLUID 2 | FLUID 3 | FLUID 4 |
|---|---|---|---|---|
| WG-18 ™ | 400 mL | 400 mL | 400 mL | 400 mL |
| Pliable Degradable Particulates | 0 | 1.5 ppg | 1 ppg | 0.3 ppg |
| Microparticulates | 0 | 0 | 0 | 0.7 ppg |
| 40/70 Natural Sand | 0 | 0 | 0.5 ppg | 0.5 ppg |

Figure 2:
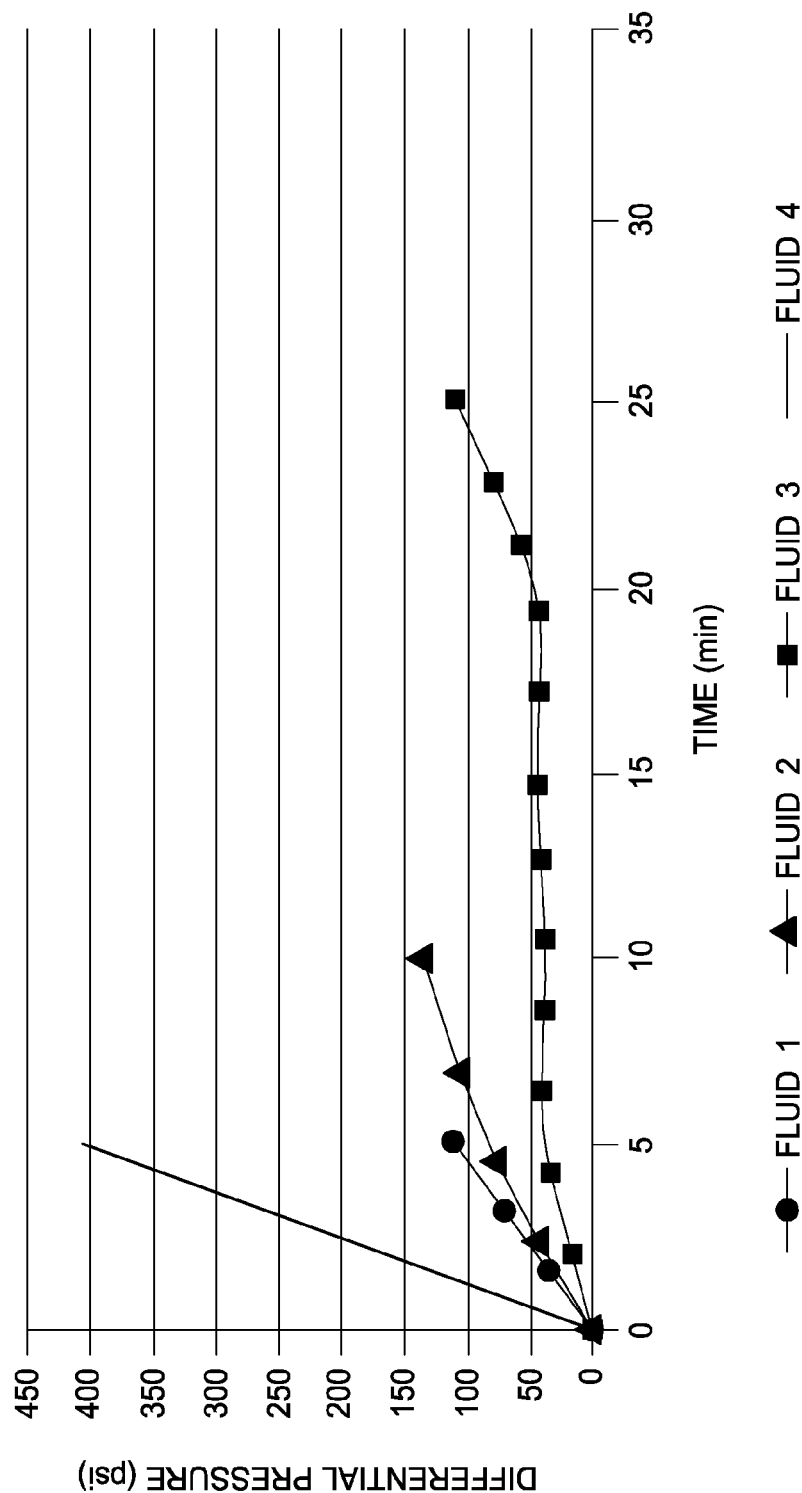
FIG. 2 shows a graph of the fluidic seal capacity of a treatment fluid comprising a fluid loss control package, according to one or more embodiments of the present disclosure.

Each of the fluids of Table 1 was pumped through a core sample within the Hassler sleeve core holder subject to the conditions above. Each fluid was pumped at 5 mL per minute in the injection direction while differential pressures were continuously recorded. Pumping continued until approximately 100 mL of each fluid was collected or until the pump over pressured at approximately 1000 psi. The results are shown in FIG. 2. As shown, Fluid 4 comprising the FLCP of the present disclosure having pliable degradable particulates and rigid non-degradable particulates of both natural sand and microparticulates formed a fluidic seal (i.e., a tight filtercake) almost immediately, and after 5 minutes was able to withstand a differential pressure of 400 psi. The remaining fluids, however, were unable to create such fluidic seals and withstand high differential pressures. Indeed, comparing Fluid 3 and Fluid 4, a massive increase in fluidic seal capability is seen despite the total amount of particulates being the same (total of 1.5 ppg), thus indicating further the ability to enhance fluidic sealing while decreasing costs associated with expensive degradable materials.

EXAMPLE 2

Figure 3:
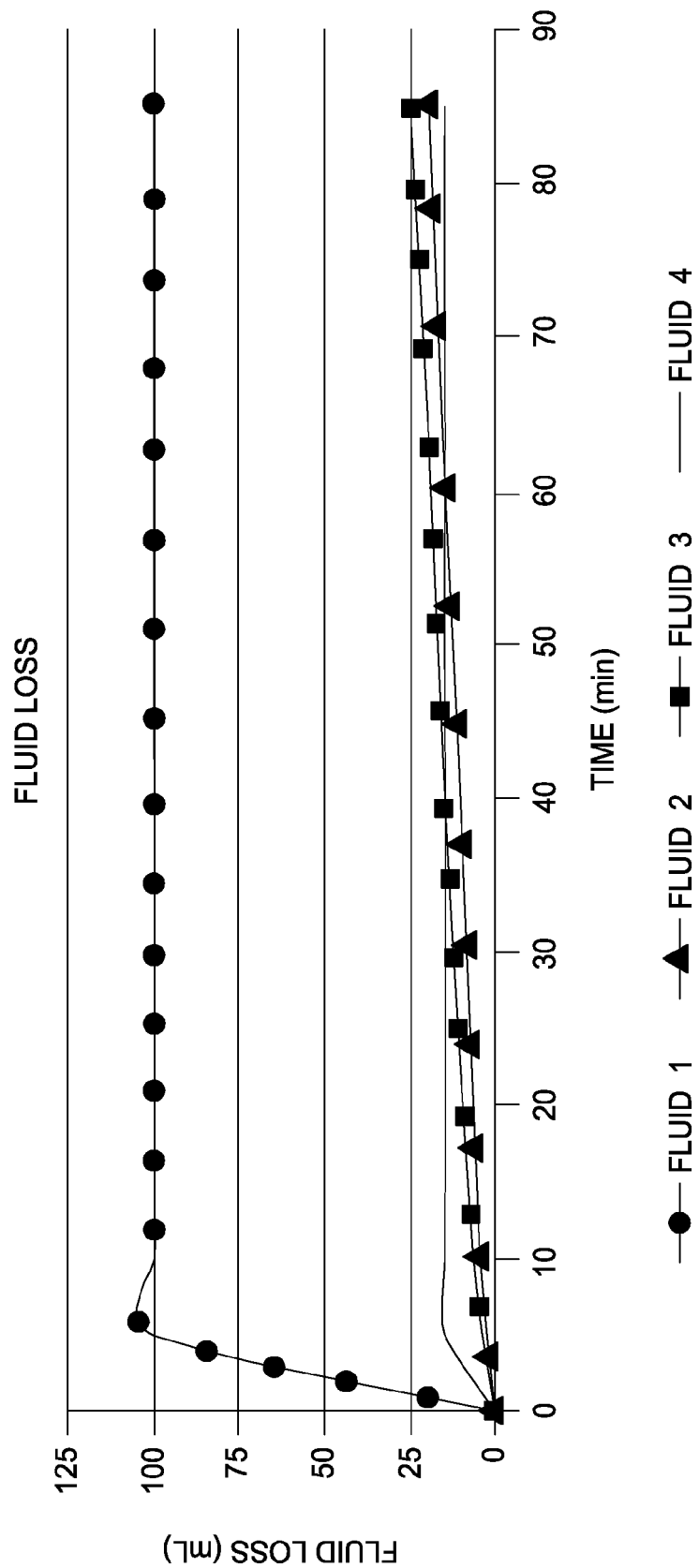
FIG. 3 shows a graph of the fluidic seal capacity of a treatment fluid comprising a fluid loss control package, according to one or more embodiments of the present disclosure.

In this example, the fluid loss (i.e., permeability) of the core samples used in Example 1 were evaluated. First, initial fluid loss readings were taken before each of Fluids 1-4 were pumped through the core samples. Finally, final fluid loss readings were taken after each of the Fluids 1-4 were pumped through the core samples. Fluid loss readings were taken by flowing a 7% KCl brine in fresh water at 20 mL per minute until fluid loss readings became stable. Both the initial and final fluid loss measurements were taken in the Hassler sleeve core holder under the conditions in Example 1, and were recorded over time as the KCl brine was flowed through the core samples. The results are shown in FIG. 3 and indicate that Fluid 4 has higher initial fluid loss compared to the other fluids but quickly forms a fluidic seal, whereas Fluids 1-3 exhibit steady leak-off over time.

EXAMPLE 3

The interior of the Fluid 4 core sample was further physically inspected after the final fluid loss readings were taken in Example 2 to evaluate the ability of the pliable degradable particulates of polylactic acid, to breakdown and be removed. The core sample was heated at 149.9° C. (300° F.) overnight, simulating potential subterranean formation temperature conditions. The core sample was split again and the interior of the halves showed that the FLCP composition was degraded and no longer forming a fluidic seal (or tight filtercake) along the center split of the cores, indicating that the FLCP degrades and is removable to reverse the fluidic seal.

Therefore, the present disclosure is well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   introducing a treatment fluid into a subterranean formation,
   wherein the treatment fluid comprises a base fluid and a fluid loss control package (FLCP), the FLCP comprising rigid non-degradable particulates and pliable degradable particulates; and forming a fluidic seal with the FLCP in the subterranean formation at a target interval, thereby providing fluid loss control therein, wherein the rigid non-degradable particulates are a combination of natural sand and microparticulates; a combination of natural sand and microfibers; or a combination of natural sand, microparticulates, and microfibers, and wherein the fluidic seal has a permeability of less than about 0.1 darcies.

2. The method of claim 1, further comprising degrading the pliable degradable particulates to enhance breakdown and removal of at least a portion of the fluidic seal.

3. The method of claim 1, further comprising flowing back the treatment fluid and producing a formation fluid from the subterranean formation, and during flow back of the treatment fluid and the production of the formation fluid, degrading the pliable degradable particulates to enhance breakdown and removal of least a portion of the fluidic seal, wherein the degraded pliable degradable particulates are removed from the subterranean formation with the flow back of the treatment fluid and/or with the production of the formation fluid.

4. The method of claim 1, wherein the fluidic seal is a temporary filtercake formed on a surface selected from the group consisting of a packed proppant pack, formation wall, a fracture face, and any combination thereof.

5. The method of claim 1, wherein the fluidic seal is formed in an opening selected from the group consisting of a perforation, a mouth of a propped fracture, a mouth of an un-propped fracture, and any combination thereof.

6. The method of claim 1, wherein the fluidic seal is formed during a subterranean formation operation selected from the group consisting of a drilling operation, a hydraulic fracturing operation, a gravel-packing operation, a frac-packing operation, and any combination thereof.

7. The method of claim 1, wherein the rigid non-degradable particulates and the pliable degradable particulates are present in the treatment fluid in a ratio of the rigid non-degradable particulates to pliable degradable particulates in an amount of from about 1:1 to about 50:1.

8. The method of claim 1, wherein the rigid non-degradable particulates are a combination of natural sand and microparticulates; a combination of natural sand and microfibers; or combination of natural sand, microparticulates, and microfibers, and wherein the microparticulates and the microfibers are composed of a material selected from the group consisting of silica flour, fly ash, a ceramic, glass, a rigid non-degradable polymer, a metal, a non-metallic mineral, and any combination thereof.

9. The method of claim 1, wherein the rigid non-degradable particulates are a combination of natural sand and microparticulates; a combination of natural sand and microfibers; or combination of natural sand, microparticulates, and microfibers, and wherein the natural sand has an average particle size diameter of from about 75 micrometers to about 840 micrometers, the microparticulates have an average particle size diameter of from about 0.1 micrometer to about 150 micrometers, and the microfibers have an average particle size diameter of from about 1 micrometers to about 150 micrometers, and an average length of from about 100 micrometers to about 10000 micrometers.

10. The method of claim 1, wherein the rigid non-degradable particulates are a combination of natural sand and microparticulates, and wherein the natural sand is in an amount of from about 25% to about 75% by weight of the rigid non-degradable particulates, and the microparticulates are in an amount of from about 25% to about 75% by weight of the rigid non-degradable particulates.

11. The method of claim 1, wherein the rigid non-degradable particulates are a combination of natural sand and microfibers, and wherein the natural sand is in an amount of from about 50% to about 75% by weight of the rigid non-degradable particulates, and the microfibers are in an amount of from about 25% to about 50% by weight of the rigid non-degradable particulates.

12. The method of claim 1, wherein the rigid non-degradable particulates are a combination of natural sand, microparticulates, and microfibers, and wherein the natural sand is in an amount of from about 10% to about 50% by weight of the rigid non-degradable particulates, the microparticulates are in an amount of from about 10% to about 50% by weight of the rigid non-degradable particulates, and the microfibers are in an amount of from about 10% to about 50% by weight of the rigid non-degradable particulates.

13. The method of claim 1, wherein the pliable degradable particulates are degradable polymers comprising a polymeric backbone having at least one carboxylic acid-derived functional group.

14. The method of claim 1, wherein the pliable degradable particulates are degradable polymers selected from the group consisting of an aiphatic polyester, a poly(lactide), a poly(glycolide), a poly(ε-caprolactone), a poly(hydroxyl ester ether), a poly(hydroxybutyrate), a poly(anhydride), a poly(carbonate), a poly(ether ester), a poly(ester amide), a poly(carbamate), a polyvinyl alcohol, a polyvinyl acetate, a poly(propylene oxide), a polysaccharide, a chitin, a chitosan, a protein, an aliphatic poly(carbonate), a poly(ortho ester), a poly(amino acid), a poly(ethylene oxide), a polyphosphazene, an amine, a polyamine, a poly(hydroxyl ester ether), and any combination thereof.

15. The method of claim 1, wherein the pliable degradable particulates have an average particle size diameter of from about 1 micrometers to about 200 micrometers.

16. The method of claim 1, wherein the treatment fluid further comprises a fluid modifier selected from the group consisting of a gelling agent, a crosslinker, a flow increasing agent, and any combination thereof.

17. A system comprising:

a tubular extending from a wellhead and into a subterranean formation; and a pump fluidly coupled to the tubular, the pump containing a treatment fluid for forming a fluidic seal in the subterranean formation, thereby providing fluid loss control, the treatment fluid comprising:

a base fluid and a fluid loss control package (FLCP), the FLCP comprising rigid non-degradable particulates and pliable degradable particulates, wherein the rigid non-degradable particulates are a combination of natural sand and microparticulates; a combination of natural sand and microfibers; or a combination of natural sand, microparticulates, and microfibers, and wherein the fluidic seal has a permeability of less than about 0.1 darcies.

18. The system of claim 17, wherein the rigid non-degradable particulates and the pliable degradable particulates are present in the treatment fluid in a ratio of the rigid non-degradable particulates to pliable degradable particulates in an amount of from about 1:1 to about 50:1.

* * * * *